US011036186B2

(12) United States Patent
Kaelin et al.

(10) Patent No.: US 11,036,186 B2
(45) Date of Patent: Jun. 15, 2021

(54) REDUCED-FRICTION SHAFT SUPPORT BEARING

(71) Applicant: Comadur SA, Le Locle (CH)

(72) Inventors: Laurent Kaelin, Sonvilier (CH); Pascal Chopard-Lallier, Montlebon (FR); Bruno Besutti, Charquemont (FR)

(73) Assignee: Comadur SA, Le Locle (CH)

( * ) Notice: Subject to any disclaimer, the term of this patent is extended or adjusted under 35 U.S.C. 154(b) by 0 days.

(21) Appl. No.: 16/344,237

(22) PCT Filed: Nov. 15, 2017

(86) PCT No.: PCT/EP2017/079302

§ 371 (c)(1),
(2) Date: Apr. 23, 2019

(87) PCT Pub. No.: WO2018/114149

PCT Pub. Date: Jun. 28, 2018

(65) Prior Publication Data

US 2019/0258207 A1 Aug. 22, 2019

(30) Foreign Application Priority Data

Dec. 23, 2016 (EP) .................................... 16206602
Feb. 22, 2017 (EP) .................................... 17157471
Feb. 23, 2017 (EP) .................................... 17157667

(51) Int. Cl.
*F16C 17/08* (2006.01)
*G04B 31/008* (2006.01)
(Continued)

(52) U.S. Cl.
CPC ..... *G04B 31/0087* (2013.01); *G04B 31/0126* (2013.01); *G04B 31/08* (2013.01)

(58) Field of Classification Search
CPC ........ F16C 17/04; F16C 17/08; G04B 31/008; G04B 31/0087; G04B 31/0126; G04B 31/08
See application file for complete search history.

(56) References Cited

U.S. PATENT DOCUMENTS 1,440,059 A * 12/1922 Colomb ............ G04B 31/0087 368/324
1,642,102 A 9/1927 Colomb
(Continued)

FOREIGN PATENT DOCUMENTS

CH 284493 7/1952
CH 310555 10/1955
(Continued)

OTHER PUBLICATIONS

Machine translation of JP 2012117842 A (Year: 2020).*
(Continued)

*Primary Examiner* — Phillip A Johnson
(74) *Attorney, Agent, or Firm* — Oblon, McClelland, Maier & Neustadt, L.L.P.

(57) ABSTRACT

A bearing includes a shaft which pivots in the bearing. The shaft includes, at at least one end thereof, a shoulder via which the shaft is in contact with an opposite surface of the bearing. The shoulder is extended by a pivot engaged in a hole provided in the bearing. The opposite surface of contact of the bearing includes at least one hollow in order to reduce the surface of contact between the shoulder of the shaft and the bearing. Application is made to the production of a bearing for a shaft of a horology movement.

9 Claims, 1 Drawing Sheet

(51) Int. Cl.
*G04B 31/08* (2006.01)
*G04B 31/012* (2006.01)

(56) References Cited

U.S. PATENT DOCUMENTS

| | | | | | |
|---|---|---|---|---|---|
| 2,003,303 | A * | 6/1935 | Mitscherling | C07C 27/10 | 204/157.9 |
| 3,397,531 | A * | 8/1968 | Dubois | G04B 31/016 | 368/324 |
| 3,435,611 | A * | 4/1969 | Hanaoka | F16C 33/103 | 368/324 |
| 3,836,213 | A * | 9/1974 | Meisner | F16C 17/10 | 384/125 |
| 3,922,041 | A * | 11/1975 | Quaile | F16C 27/08 | 368/324 |
| 9,678,478 | B2 * | 6/2017 | Hendricks | A61M 1/10 | |
| 2002/0135108 | A1 * | 9/2002 | Billiet | G04B 31/06 | 264/669 |

FOREIGN PATENT DOCUMENTS

| | | | |
|---|---|---|---|
| CH | 311285 | | 11/1955 |
| CH | 710 846 | A2 | 9/2016 |
| JP | 2003-156575 | A | 5/2003 |
| JP | 2008-45573 | A | 2/2008 |
| JP | 2009-2436 | A | 1/2009 |
| JP | 2012-117842 | A | 6/2012 |

OTHER PUBLICATIONS

International Search Report dated Apr. 3, 2018 in PCT/EP2017/079302 filed Nov. 15, 2017.

Notice of Grounds for Rejection dated Aug. 10. 2020 in corresponding Korean Patent Application No: 10-2019-7012887 (with English translation)(10 pages).

Notice of the Reason for Refusal dated May 26, 2020 in corresponding Japanese Patent Application No: 2019-524233 (with English translation)(9 pages).

* cited by examiner

REDUCED-FRICTION SHAFT SUPPORT BEARING

TECHNICAL FIELD OF THE INVENTION

The present invention relates to a bearing for micromechanics in which a shaft is capable of pivoting, the shaft comprising, at at least one end thereof, a shoulder via which the shaft is in contact with an opposite surface of the bearing, said shoulder being extended by a pivot engaged in a hole provided in the bearing. Such a bearing is in particular used in the horological field.

TECHNOLOGICAL BACKGROUND OF THE INVENTION

In order to drive a wheel in rotation in a horological movement, the wheel is known to be secured to a shaft comprising, at at least one of the ends thereof, a shoulder extended by a pivot. The shaft is positioned between two bearings, each of which comprises a hole in which is housed a pivot of the shaft. According to the chosen construction method, the shoulder of one end of the shaft or the shoulder of each end of the shaft enters into contact with an opposite surface of the associated bearing. The two bearings guide the shaft in rotation while preventing the axial translation thereof.

One known method for reducing friction between the shoulder of the shaft and the bearing is to arrange a recess on an outer edge of the hole in which is housed the pivot of the shaft in order to create a reservoir, commonly called an oil-sink, and intended to receive a drop of oil. The drop of oil present in the reservoir infiltrates by capillarity between the shaft and the walls of the hole of the bearing, and between the shoulder of the shaft and the surface of the bearing facing said shoulder. This technique is used to reduce friction between the shaft and the bearing. However, the layer of oil between the shoulder of the shaft and the opposite surface of the bearing is particularly thin, resulting in the observation of an adherence effect between the shoulder of the shaft and the opposite surface of the bearing and, when the shaft turns, a shear stress of the layer of oil opposes the rotation of the shaft. These interference phenomena result in a loss of energy, which should be avoided.

SUMMARY OF THE INVENTION

The purpose of this invention is to improve the known technique, by proposing a solution for reducing the shear stress in the region of the layer of oil present between the shoulder of a shaft and the opposite surface of a bearing in which the shaft is pivoted.

To this end, the present invention relates to a bearing for micromechanics, in which pivots a shaft, the shaft comprising, at one end thereof, a shoulder via which the shaft is in contact with an opposite surface of the bearing, said shoulder being extended by a pivot engaged in a hole provided in the bearing, the surface of the bearing facing the shoulder of the shaft comprising at least one recess in order to reduce the surface of contact between the shoulder of the shaft and the bearing.

By reducing the surface of contact between the shoulder of the shaft and the bearing, the shear stress effect in the layer of oil is reduced. The shaft therefore pivots more easily in the bearing. Moreover, even when reduced, the surface of contact remains sufficient for guiding the shaft in the bearing.

According to one embodiment of the invention, the recess is present in the form of a ring centred around the hole of the bearing. The effect, i.e. the torque produced by the elementary shear stress, is the product of this shear stress multiplied by the distance between the rotational axis and the point of application of the elementary stress. By producing an annular recess distanced from the pivot of the shaft, the effects of the shear stress are even more reduced.

According to another embodiment of the invention, the surface facing the bearing via which the shoulder of the shaft is in contact with the bearing is provided with a plurality of hollows distributed around the hole of the bearing. The reduction in the effect of the shear stress is therefore more homogeneous between the shoulder of the shaft and the surface of the bearing facing the shoulder of the shaft.

BRIEF DESCRIPTION OF THE FIGURES

Other features and advantages of the present invention shall be better understood upon reading the detailed description given below of example embodiments of bearings according to the invention. These examples are given for illustrative purposes only and are not intended to limit the invention; they must be read with reference to the accompanying figures, in which.

DETAILED DESCRIPTION OF ONE EMBODIMENT OF THE INVENTION

The present invention is based on the general inventive idea consisting in reducing the surface of contact between the shoulder of a shaft and the opposite surface of a bearing supporting said shaft. For this purpose, the invention proposes a new bearing, the overall shape of which reduces said surface of contact.

Figure 1:
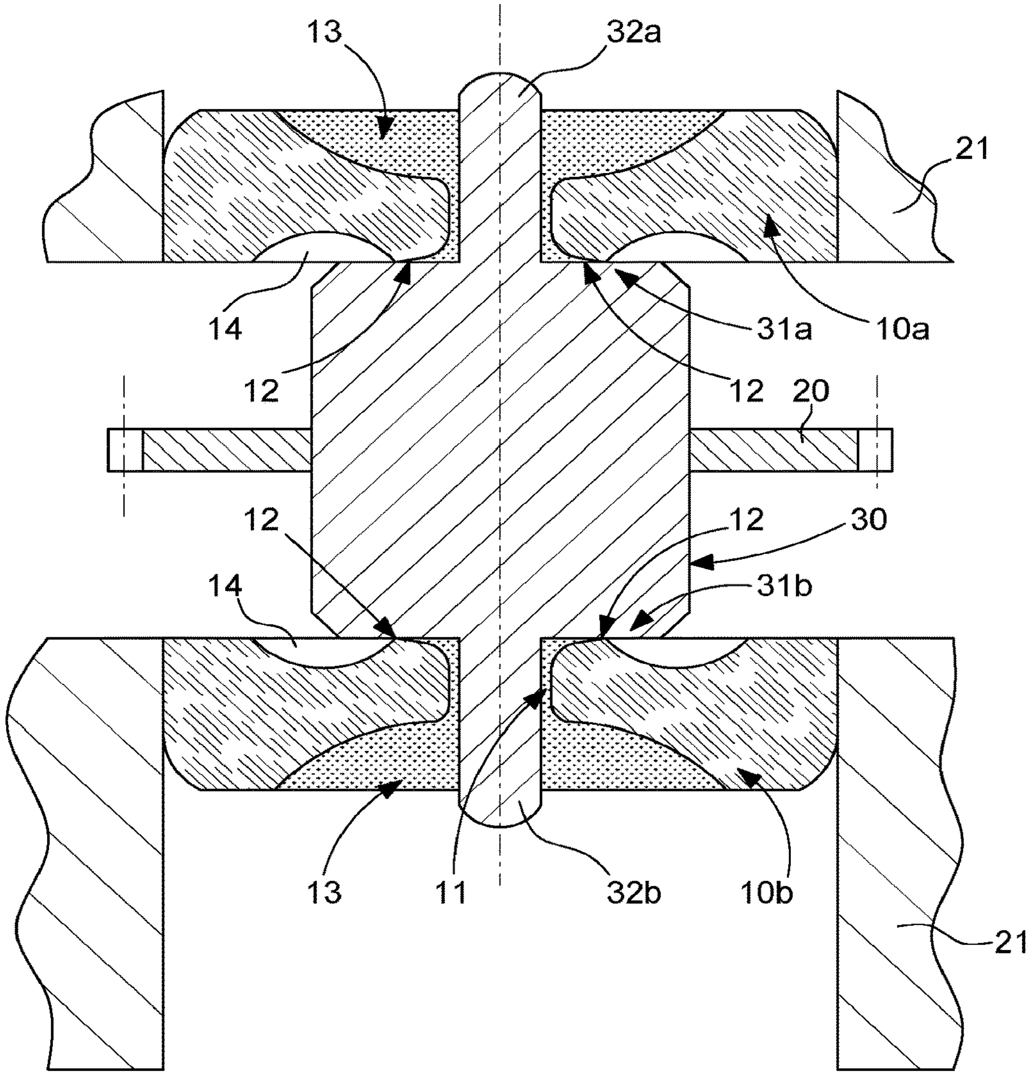
FIG. 1 is a view of a wheel of a horology movement mounted such that it rotates between two bearings according to the invention.

FIG. 1 diagrammatically shows the implementation of bearings according to the invention for driving in rotation a toothed wheel of a horology movement.

The toothed wheel 20 is secured to a shaft 30 comprising, at each end thereof, a shoulder 31*a*, 31*b* extended by a pivot 32*a*, 32*b*. The shaft 30 is mounted such that it rotates between two bearings 10*a*, 10*b* according to the invention. The bearings 10*a*, 10*b*, preferably annular in shape, are immobilised in a frame 21. Said bearings 10*a*, 10*b* comprise, in a known manner, a hole 11, that is preferably centred, passing through said bearings from end to end. It is observed that the wall of the hole 11 can comprise an olive-cut intended to minimise contact with the pivots 32*a*, 32*b* and ease possible lubrication.

A pivot 32*a*, 32*b* of the shaft 30 guided in rotation by the corresponding bearing 10*a* or 10*b* is housed in the hole 11. The shoulder 31*a*, 31*b* of the shaft 30 enters into contact with an opposite surface 12 of the bearing 10*a*, 10*b* such that the shaft 30 is immobilised in axial translation, to the nearest play, between the bearings 10*a*, 10*b*.

On a side opposite the surface of contact 12 between the shoulder 31*a*, 31*b* of the shaft 30 and the bearing 10*a*, 10*b*, the hole 11 opens out into a recess 13, having a preferably conical shape. This recess 13, commonly called an oil-sink in the horological field, can be intended to receive a drop of oil. The other end of the hole 11 is slightly flared in order to ease the infiltration of the oil between the bearing 10*a*, 10*b* and the shoulder 31*a*, 31*b* in the region of the surface of contact 12. It is understood that this recess is optional and that it will only be provided in the event that the pivoting of the shaft 30 in the bearing 10*a*, 10*b* will be lubricated.

A bearing 10*a*, 10*b* according to the invention is characterised by a hollow 14 for reducing the surface of contact 12 between the shoulder 31*a*, 31*b* of the shaft 30 and the bearing 10*a*, 10*b*. The hollow 14 is made on the side opposite the recess 13, in the surface of contact 12 of the bearing 10*a*, 10*b* situated facing the shoulder 31*a*, 31*b* of the shaft 30.

Figure 2:
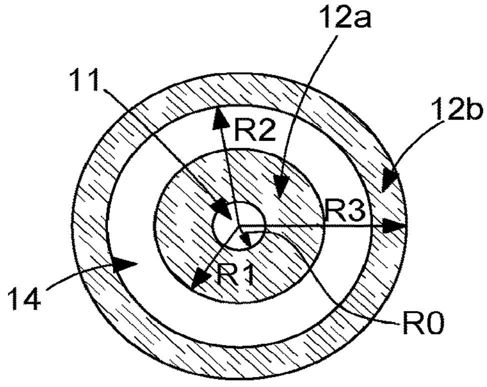
FIG. 2 is an overhead view of a bearing according to the invention.

According to one embodiment shown in FIG. 2, the hollow 14 is annular in shape. The residual surface of contact 12 between the shoulder 31*a*, 31*b* of the shaft 30 and the bearing 10*a*, 10*b* thus has the shape of two inner 12*a* and outer 12*b* concentric rings. The inner radius R0 of the inner ring 12*a* is substantially equal to the radius of the hole 11, whereas the outer radius R1 of the inner ring 12*a* is equal to the inner radius of the hollow 14. The outer concentric ring 12*b* on the other hand lies between an inner radius R2 equal to the outer radius of the hollow 14 and an outer radius R3. The radius R1 must be sufficient to guarantee that the shaft 30 is correctly held inside the hole 11.

Figure 3:
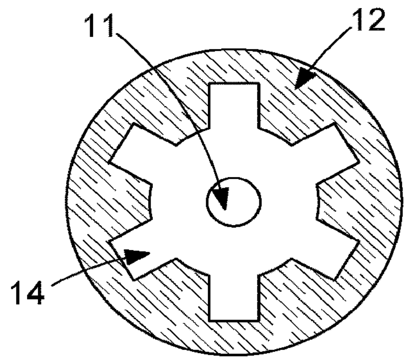
FIG. 3 is an overhead view of another bearing according to the invention.

According to another embodiment, a plurality of hollows 14 are hollowed out of the surface of the bearing 10*a*, 10*b* around the hole 11. In the example shown in FIG. 3, six hollows 14 are evenly spaced apart, arranged in a concentric manner about the pivot 32*a*, 32*b* of the shaft 30 and opening out into the flared end of the hole 11.

In the horological field, the dimensions of the bearings are small, from less than 1 mm to several millimetres for the largest dimension. The production of a bearing according to the invention is therefore delicate and requires specific tooling.

According to an alternative embodiment, the bearing 10*a*, 10*b* is made from a hard, monocrystalline material such as ruby, corundum, spinel or cubic zirconia and the hollows 14 are machined by material ablation using a laser beam, by spark erosion or by grinding.

According to another alternative embodiment, the bearing 10*a*, 10*b* is made from a hard, sintered material such as corundum, ruby, ceramics, alumina, zirconia or even a hard metal, and the hollows 14 are made by forming or are ablation-machined. This technique is in particular described in the document EP 2 778 801 A1 filed by the Applicant.

For reference, the method comprises a first step of forming a ceramic precursor from a ceramic-based powder dispersed in a binder. This ceramic-based powder can contain at least one metal oxide, one metal nitride or one metallic carbide. For the purposes of illustration, the ceramic-based powder can contain aluminium oxide in order to form synthetic sapphire or a mixture of aluminium oxide and chromium oxide to form synthetic ruby. The binder on the other hand can be a polymer binder or an organic binder.

The method comprises a second step that uses an upper die and a lower die, that are brought closer to each other, to compress the ceramic precursor in order to form a green body of the future bearing 10*a*, 10*b* with upper and lower surfaces respectively comprising at least one hollow 14 and, where applicable, a recess 13. It is therefore understood that each green body thus formed already comprises the blanks of the hollow 14 and of the recess 13.

In order to obtain these blanks of the hollow 14 and of the recess 13, each substantially planar die comprises at least one punch intended to form the hollow 14 and, optionally, the recess 13. To this end, the upper die comprises a punch with a substantially annular surface for forming the hollow 14, and the lower die comprises a punch with a substantially conical surface for forming the recess 13.

Finally, the green body is sintered in order to form a ceramic bearing 10*a*, 10*b* and the hole 11 is bored in order to connect the upper surface and the lower surface of the bearing 10*a*, 10*b* to each other. This step preferably takes place using destructive radiation of the laser type, in order to obtain very precise etching. However, this step can take place, for example, by mechanical boring or etching with high-pressure water.

It is evident that this invention is not limited to the embodiments described above and that various simple alternatives and modifications can be considered by one of ordinary skill in the art without departing from the scope of the invention as defined by the accompanying claims. It should in particular be noted that in the basic embodiment thereof, this invention applies in the event that only one of the two bearings 10*a*, 10*b* that guide the shaft 30 is equipped, in the surface of contact 12 thereof with the shoulder 31*a* or 31*b* of the corresponding pivot 32*a* or 32*b*, with a hollow 14 according to the invention. The case in which both bearings 10*a*, 10*b* each have a hollow 14 to reduce the range of the surface of contact 12 with the shoulders 31*a* and 31*b* of the pivots 32*a* and 32*b* is also evidently considered.

NOMENCLATURE

10*a*, 10*b*. Bearings
11. Hole
12. Surface of contact
12*a*. Inner concentric ring
12*b*. Outer concentric ring
R0, R2. Inner radii
R1, R3. Outer radii
13. Recess
14. Hollows
20. Wheel
21. Frame
30. Shaft
31*a*, 31*b*. Shoulders of the shaft
32*a*, 32*b*. Pivots of the shaft

The invention claimed is:

1. A bearing for micromechanics in which a shaft pivots, the shaft comprising, at at least one end thereof, a shoulder via which the shaft is in contact with a first surface of the bearing that faces the shoulder, the shoulder being extended by a pivot engaged in a hole provided in the bearing, wherein the first surface of the bearing comprises at least one hollow positioned radially outside of the first surface of the bearing that is in contact with the shaft in order to reduce a surface of contact between the shoulder of the shaft and the bearing.

2. The bearing according to claim 1, wherein the hollow is present in the form of a ring centred around the hole of the bearing.

3. The bearing according to claim 1, wherein the first surface of the bearing is provided with a plurality of hollows distributed around the hole of the bearing.

4. The bearing according to claim 3, wherein the hollows are evenly spaced apart and arranged in a concentric manner around the hole of the bearing.

5. The bearing according to claim 1, wherein the bearing is made from a monocrystalline material chosen from the group containing ruby, corundum, spinel or cubic zirconia, the hollow being machined by material ablation using a laser beam, by spark erosion or by grinding.

6. The bearing according to claim 1, wherein the bearing is made from a sintered material chosen from the group containing sintered corundum, sintered ruby, sintered ceramics, sintered alumina, sintered zirconia or a sintered hard metal, the hollow being made by forming or by ablation machining.

7. The bearing according to claim 1, wherein the bearing includes a recess on a second surface, the second surface being opposite to the first surface.

8. The bearing according to claim 7, wherein the recess has a conical shape.

9. The bearing according to claim 1, wherein the shoulder is planar, and a radially outermost edge of the shoulder is spaced apart from the bearing due to the hollow when the shoulder is in contact with the bearing.

* * * * *